United States Patent [19]

Stephens

[11] 4,270,517
[45] Jun. 2, 1981

[54] FLUID OPTICAL SWITCH FOR A SOLAR COLLECTOR

[75] Inventor: Richard B. Stephens, New Providence, N.J.

[73] Assignee: Exxon Research and Engineering Company, Florham Park, N.J.

[21] Appl. No.: 27,075

[22] Filed: Apr. 4, 1979

[51] Int. Cl.³ .................... F24J 3/02; G05D 25/00
[52] U.S. Cl. ................................ 126/422; 126/417; 126/418; 136/244; 350/484
[58] Field of Search ............... 126/418, 422, 417, 432, 126/419; 350/285, 267; 136/89 PC

[56] References Cited

U.S. PATENT DOCUMENTS

| | | |
|---|---|---|
| 3,577,352 | 5/1971 | Kelkheim . |
| 3,609,004 | 9/1971 | Taylor . |
| 3,612,653 | 10/1971 | Rajchman ........................ 350/363 |
| 3,703,332 | 11/1972 | Taylor ................................ 350/363 |
| 3,723,349 | 3/1973 | Hesltine et al. . |
| 3,790,250 | 2/1974 | Mitchell et al. . |
| 3,939,819 | 2/1976 | Minardi . |
| 4,055,163 | 10/1977 | Costello et al. . |
| 4,056,094 | 11/1977 | Rosenberg ........................... 126/440 |
| 4,148,563 | 4/1979 | Herbert .............................. 350/285 |
| 4,167,934 | 9/1979 | Miles .................................. 126/422 |
| 4,169,460 | 10/1979 | Popovich et al. .................... 126/422 |

Primary Examiner—James C. Yeung
Assistant Examiner—Larry Jones
Attorney, Agent, or Firm—Paul E. Purwin

[57] ABSTRACT

Apparatus for optical switching which uses a fluid medium whose refractive index is matched to that of a highly dispersed optical scattering layer to provide optical transparency of said scatterer when immersed in the fluid media and optical reflection in the absence thereof. The fluid optical switch is embodied in a solar energy collector to provide overtemperature protection to collector components and further to provide a convenient means for turning off the collector during periods of nonuse.

9 Claims, 3 Drawing Figures

FLUID OPTICAL SWITCH FOR A SOLAR COLLECTOR

BACKGROUND OF THE INVENTION

The present invention relates generally to optical switches and in particular to an optical switch utilizing a fluid media having an index of refraction matched to a contiguous light scattering layer. When the fluid contacts the optically scattering material, their interface becomes virtually transparent. Embodied in a solar collector, the optical switch, when activated, removes the fluid media, thus turning off the collector until a satisfactorily low temperature is achieved.

Solar thermal energy converters have been proposed as viable alternatives to petrochemical and similarly conventional home heating means. Manufacturers of lower temperature home heating solar collectors have continually sought lower cost alternatives to improve the cost effectiveness of solar energy vis-a-vis conventional heating techniques. An approach taken by a number of solar panel manufacturere is to substitute plastic components for the more costly copper and other metallic components. Substituting plastic components saves both on cost of producing the panel and on the weight of the panel. See, for example, U.S. Pat. Nos. 3,918,430 and 4,046,135. Although plastic components may readily be substituted for many typical collector parts, these plastic components conventionally have upper working temperature limits in the general operating temperature range of the collector. These plastic components function adequately under normal collector system operation. However, in the instance where the collector's heat transfer means is interrupted, the temperature of the collector rises substantially. The temperature in a conventional flat plate collector, in the absence of heat exchange means, may exceed 150° C. A limited number of plastics can withstand these temperatures, and plastics capable of withstanding these temperatures are generally more costly than their metal counterparts. These devices may be generally categorized as employing either mechanical means to expel unwanted heat from the collector, or optical means for reducing the amount of light absorbed by the collector. The present invention relates to this latter category, that is optically inhibiting light from reaching the solar collector.

PRIOR ART

Prior teachings with regard to optically impeding light from reaching the solar collector, hereinafter optical filtration, have failed to provide simple, inexpensive temperature limiting means which are readily adapted to conventional large area solar collectors. For example, in both U.S. Pat. Nos. 4,055,163 and 3,939,819 there is disclosed the concept of using the collector's thermal exchange fluid as the solar absorber. In the event that the collector fluid is lost, the solar panel is no longer strongly absorbent of sunlight and there is a corresponding reduction in temperature. The invention, however, is restricted to a collector employing a strongly light absorbing fluid.

Thermally responsive optical filtration is an alternative means for temperature limitation in a solar collector. Chalcogenide glassy semiconductors, such as those disclosed in U.S. Pat. No. 3,790,250, for example, display temperature dependent light transmission characteristics. In a similar respect thermochromic materials such as those disclosed in U.S. Pat. No. 3,723,349 display temperature dependent color changes. Aside from the economic factors which would deter the use of such filters in large area solar collector applications, these filters suffer several technical drawbacks. The filtration is achieved by absorption, therefore the filter itself heats up. In the case of the glassy semiconductors, absorption is bandgap absorption, which, dependent upon each individual semiconductor material, selectively absorbs (and thereby selectively filters) only a portion of the solar spectrum. Where heat additions to the system are of concern, it is preferable to reflect unwanted light energy from the system. The present invention utilizes optical scattering from a plurality of reflecting but non-absorbing particles. These particles may be independent or in the form of a continuous network. This scattering layer provides temperature limitation to a solar panel by diffusely reflecting a substantial amount of the incident light from the solar collector. This reflecting medium may be rendered transparent and the collector restored to essentially full absorption efficiency by immersing the scattering layer in a fluid whose refractive index matches that of the scattering layer. In U.S. Pat. No. 3,609,004, Taylor discloses a means for directing light beams by passing the beams through a plurality of chambers containing fluids of differing refractive indices. The light "bending" affects only those beams incident normal to the beam directing device (perpendicular incidence). In contrast, the present invention provides a light scattering layer which is highly reflective to light incident at virtually any angle. This scattering layer is rendered transparent by optically matching a fluid medium having a refractive index about equal to the reflective surface.

The Christiansen Effect is a known photo optical phenomenae. As described in American Institute of Physics Handbook, the Christiansen Effect is the condition whereupon "finely powdered substances, such as glass or quarts, are immersed in a liquid of the same index of refraction to obtain complete transparency for monochromatic light. If white light is employed, the transmitted color corresponds to the particular wavelength for which the two substances, solid and liquid, have exactly the same index of refraction. Because of differences in dispersion, the indices of refraction will match for only a narrow band of the spectrum."

The Christensen effect requires an extremely large number of surfaces to compensate for the small relative changes in the refractive indices across the visible spectrum. In contrast, the present invention employs substantially fewer reflective surfaces to obtain transparency to a broad spectrum of incident light when the fluid media of matching refractive index contacts the surface.

An example of the application of a Christensen fitter may be found in U.S. Pat. No. 3,577,352. There is shown a temperature indicating device having a temperature dependent color change. The relatively low value of dispersion which enables that invention to operate as a temperature indicating device would prohibit its use as an optical switch.

SUMMARY OF THE INVENTION

The present invention provides a fluid activated optical switch having a highly dispersed optically reflective light scattering layer compressor material which is rendered light transmitting upon its immersion in a fluid media having a refractive index matching that of the scattering layer. The scattering layer is characterized as a highly dispersed transparent material having a multiplicity of surfaces. These surfaces may be oriented in a number of geometries or randomly oriented. The scattering characteristics of this switch are attributable to an incidence of light upon a highly dispersed material of a given refractive index which material is immersed in a light transmitting media having a substantially different refractive index (i.e., air). Upon immersing said scattering layer within an optically transparent fluid media having a refractive index about equal to the scattering layer, the surface is rendered transparent, that is light passes through the optical switch. The fluid activated light switch is embodied in a solar thermal energy converter to provide over temperature protection to the solar panel. The fluid media, which envelops the scattering layer, separates from the layer when the collector reaches a pre-determined temperature. This produces an optically reflective surface, substantially reducing the light reaching the photo receptor, therein reducing the temperature of the collector. Once cooled the fluid returns to the collector. The present invention provides large area capability for optical switching means which switching means may be activated manually and/or automatically being responsive to temperature.

DETAILED DESCRIPTION OF THE INVENTION

The present invention provides optical switching means to provide over-temperature protection for solar energy collectors. As illustrative thereof, in FIG. 1 there is shown a solar panel having the fluid optical switch of the present invention.

The optical device includes a generally rectangular frame having a base 10 with upwardly extending side walls 12 (end walls not shown). The base and walls may be fabricated of any conventional material, however it is preferred that the material be thermally insulating and of sufficient strength and rigidity to be supportive of its own weight and collector components described hereunder. The panel includes an optically transparent cover plate 14 secured to said side walls and defining a chamber between the cover plate 14 and the base 10 of the device frame. The cover plate is constructed of any material which is generally transparent to solar radiation and preferably of material which is reflective of infra-red wavelengths in excess of 20 microns.

Figure 1A:
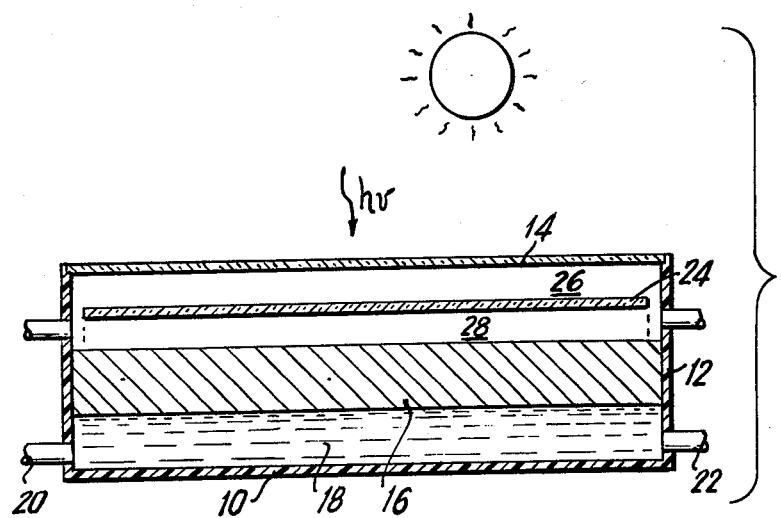
FIG. 1A is a cut away side view of a solar thermal energy conversion device employing the optical switch of the present invention.
Figure 1B:
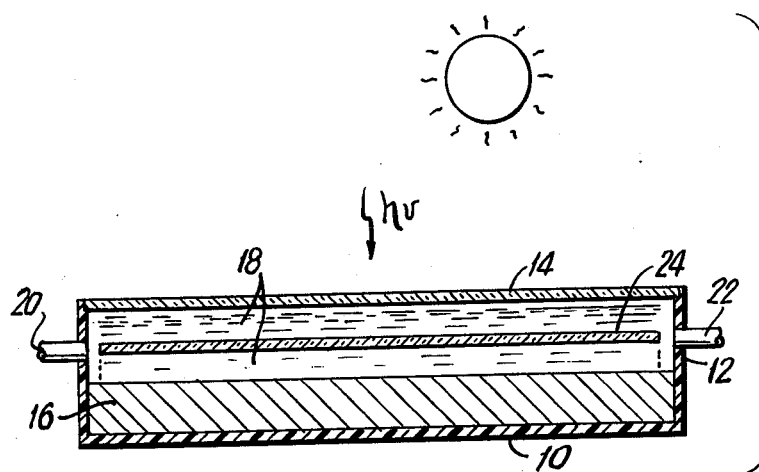
FIG. 1B is a side view of a second embodiment of the present invention.

A photo receptor 16 comprises a solar energy absorbing surface displaying strong absorption (i.e. 0.90% absorbing) throughout the solar spectrum (i.e. 0.3 to 2.0 microns). Such surfaces are well known in the art. The solar energy absorbing surface, hereinafter collecting surface, is held contiguous to a thermal exchange fluid 18. Although illustrated as vertically sequential layers, the thermal exchange fluid may advantageously pass through and about the collector surface. For example, the thermal exchange fluid may serve as the optical coupling media when interposed between the photo receptor and the light source, as is illustrated in FIG. 1B, where components identical to FIG. 1A are designated by the same reference number. Thermal exchange fluid inlet and outlet conduit 20 and 22, here shown at horizontally opposite ends of said frame, provide fluid flow to and from the solar panel. Manifold means (not shown) may be provided to connect said inlet and outlet conduit to conventional thermal exchange means (also not shown) such as home heating units, etc.

The device as described heretofore is not unlike conventional solar thermal collector devices and obvious variations of the basic solar panel design may readily be adapted to use with the optical switching means of the present invention.

An optically scattering layer having a surface of a known or ascertainable index of refraction n is interposed between the collector surface 16 and the optically transparent cover 14. This scattering layer comprises a highly dispersed, multisurfaced layer of a generally light transparent material. Although the material itself is light transmitting, incident light is scattered as a result of the reflective properties of each interface; a material of refractive index $n_1$ being in optical contact with a media of substantially different index of refraction $n_2$ (air, for example). Examples of materials suitable for use in forming the scattering layer are set forth in Table I along with their corresponding indexes of refraction.

TABLE I

| Material | Index of Refraction |
| --- | --- |
| Cellulose Acetate | 1.46–1.50 |
| Cellulose Acetate Butyrate | 1.40–1.49 |
| Polyethylene (low density) | 1.50–1.54 |
| Polymethyl Methacrylate | 1.48–1.50 |
| Polypropylene | 1.49 |
| Polytrifluorochloroethylene | 1.43 |
| Polytetrafluoroethylene | 1.3–1 |
| Acetal | 1.48 |

The scattering surface of the present invention contains a sufficient number of surfaces to provide greater than about 50% reflection of incident light dependent upon the path length of light through the scattering layer. For example, if glass having n=1.5 comprises the scattering material, about 60 surfaces must be transversed by the incident beam to assure substantial reflection and effective operation of the optical switch. Randomly oriented surfaces are of advantage inasmuch as they are relatively simple to produce in the form of a fibrous mat or a sponge topology, but oriented surfaces may also be used, e.g. parallel fibers, woven fibers, perforated sheets and the like. For all configurations, light incident other than normal to the collector plane will also be refractively scattered by the surfaces.

An optically transparent fluid having an index of refraction about equal to the refractive index of the material within the scattering layer 24 is fed into a plenum 26 defined as that region within said frame and coverplate, and contiguous to said scattering layer 24. The fluid contacts virtually every surface of the scattering layer 24. Examples of liquids suitable for use as the optical fluid (and their corresponding index of refraction) may be found in Table II.

TABLE II

| Liquid | Index of Refraction |
| --- | --- |
| Ethylene glycol 60% in H₂O | 1.39 |
| Water | 1.33 |
| Paraffin | 1.43 |
| Sugar soln. in water (40-80% concentration) | 1.4-1.5 |
| Calcium chloride | 1.443 |

To facilitate the complete contacting of substantially all surfaces of the scattering layer, fluid channels 28 may be provided through and about the scattering material. Upon immersing said scattering material within a transparent fluid having an index of refraction about equal to that of the material, reflection of light no longer occurs. That is to say there no longer exists the optical disparity between the transport medium for the fluid and the formerly scattering material. The layer 24 is therefore rendered substantially transparent and incident light will pass through layer 24 to collector surface 16 where the photon energy will be converted to heat energy and the solar panel will function in a conventional manner. Removing the optical fluid media restores the reflective properties of the scattering layer 24, preventing a substantial portion of the light rays from reaching the collector surface 16 and thereby reducing the temperature of the solar panel. That is to say the solar panel may selectively be turned on and off by the presence or removal of the optically matching fluid media within the scattering layer, which layer is interposed between the collector surface 16 and a photon source (i.e., the sun).

Figure 2:
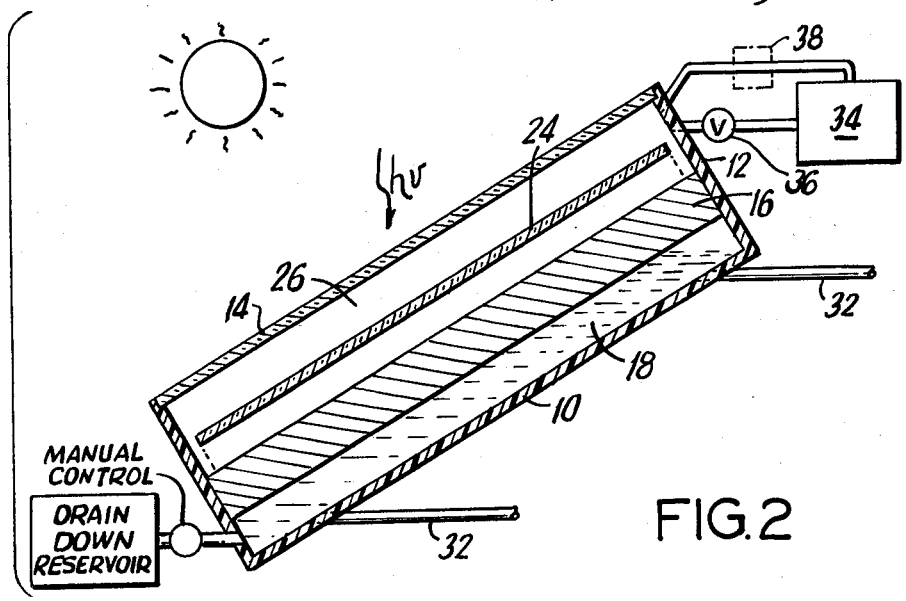
FIG. 2 is a side view of a solar thermal energy conversion device having automatic temperature limit control means in accordance with the present invention.

In FIG. 2 there is shown a preferred solar energy converter of the present invention. A solar panel, generally designated 30, is essentially equivalent of the solar panel of FIG. 1. In this embodiment, however, in addition to manual switching, the optical switching means of the present invention automatically "turns off" the solar panel 30 when a pre-determined panel temperature is attained. Accordingly, in FIG. 2 solar panel 30 including optical scattering layer 24 interposed between a light energy source and the solar collection surface 16, utilizes an optically transparent fluid having a predetermined boiling temperature (under the given pressure conditions of the operating solar converter). As previously described, an optical fluid media which has an index of refraction about equal to the refractive index of the material of the scattering layer, renders the layer transparent upon contacting same. During that period when the optical fluid media fills said scattering layer 24, the energy converter operates in a conventional manner. Should the solar panel exceed a pre-determined temperature limit, the optical fluid media, having a boiling temperature selected to correspond to said temperature limit, vaporizes. In a gaseous state, the optical media no longer provides the matching refractive index required for light transparency through layer 24, and an increasing amount of light is reflected from the scattering surface. The vaporized fluid passes through outlet conduit 32 into condenser chamber 34 where the cooled vapor transforms again to its liquid state. The increased reflection reduces the light incident upon the collector surface 16 and produces a corresponding reduction in panel temperature. As the temperature of the panel returns below the predetermined temperature limit, the condensed light is returned to the panel to restore collector operation. Conventional temperature activated valves 36 provide temperature responsive control for returning the optical fluid to the solar panel 30.

The "turn off" temperature is dependent upon the boiling temperature of the optical fluid media chosen, that is, different fluids may be chosen to provide different boiling temperatures. Additionally, the boiling temperature may be increased by operating the panel at increased pressures. Conventional pressure regulating means shown in phantom at 38 provides the ability to adjust the boiling temperature, and thereby the "turn off" temperature for a given optical fluid.

Referring now to the scattering layer 24, as previously described, this layer comprises a highly dispersed multisurfaced transparent material having a known or ascertainable index of refraction. A random distribution of surfaces provides a plurality of angles of incidence to all incoming light. The scattering layer may comprise more than one discrete layer of dispersely refractive material insuring substantial reflection of incident light. Materials such as fibrous glass matting, open cell foams of transparent plastics such as polyurethane foams, quartz wool, parallel or woven fibers of all the above and parallel perforated sheets of all the above are suitable.

The inventor has realized that the refractive index of these materials vary slightly with wavelength. For example, the refractive index of crystallized quartz decreases from a value of 1.5482 at a wavelength of 0.508 microns to a value of 1.520 at a wavelength of 2.05 microns. Furthermore, the refractive index is also temperature dependent; for example, polystyrene displays a refractive index of 1.542 at 15° C., decreasing to 1.586 at 55° C. These small changes in the refractive indices, however, do not substantially alter the optical matching to the fluid media since its refractive index is similarly influenced by both wavelength and temperature. The following examples are included to further illustrate the present invention:

EXAMPLE 1

A solar collector device similar to that illustrated in FIG. 1 was constructed having an insulated base and side walls and an optically transparent cover plate. A solar absorbing surface utilizing a chrome black absorbing surface was positioned within the collector frame along with conventional thermocouples to monitor the interior temperature of the panel. A tungsten filament light source was utilized to irradiate the panel and its intensity adjusted so that the panel reached a stagnation temperature of 100° C. An optically scattering layer of open cell polyurethane foam was interposed between the collector surface and the cover plate. The foam layer was 1 cm in thickness having an individual cell diameter of about 0.01 cm. The index of refraction of the foam, as reported in The Polymer Handbook, was about 1.54. The panel was irradiated as in the prior test, allowing sufficient time to establish a stagnation temperature. The panel with the reflective scattering surface reached a stagnation temperature of 79° C., a substantial reduction in panel temperature. Benzyl alcohol, having a refractive index of about 1.54 according to Handbook of Chemistry and Physics, which is virtually identical to the refractive index of the foam scattering layer, was introduced into the area of the panel contiguous to the scattering layer. Once again the panel was irradiated in the manner set forth initially. The panel reached a stagnation temperature of about 97° C.

EXAMPLE 2

Example 2 is virtually identical to Example 1, except that a 0.5 mm thick scattering layer of polytetrafluoroethylene foam having a configuration of a thin mat of very fine fibers, each fiber being about 5 microns in diameter has been substituted for the polyurethane foam of FIG. 1. The polytetrafluoroethylene foam has a reported refractive index of N=1.30–1.40. An optical fluid media of 40 weight percent ethylene glycol in water, a fluid which is amenable to conventional use in solar energy convertors, replaced the alcohol of Example 1.

What is claimed is:

1. A fluid optical switching means to provide controllable reflection of incident light, said switching means comprising:
   a photoreceptive layer responsive to incident photon energy;
   a relatively thin optical scattering layer interposed between said photo-receptive layer and a source of light energy, said scattering layer comprising a highly dispersed, multisurfaced layer of an essentially transparent material having a predetermined index of refraction dispersed in a second light transmitting media having an index of refraction differing from the index of refraction for said material;
   a layer of optically transparent fluid media, contiguous to said multisurfaced scattering layer and contacting essentially all surfaces thereof, said fluid media having an index of refraction about equal to the refractive index of said scattering surface, whereupon contacting said scattering layer with said fluid of matched refractive index, said layer is rendered transparent;
   container means having at least one light transparent window, said container means retaining said fluid media contiguous to said scattering surface and maintaining an interpositioning of the scattering layer between said absorbing surface and said transparent window;
   fluid extracting means for controllably removing the optical fluid media from said container and further from contacting said multisurfaced scattering layer, whereupon removing said fluid from contacting said scattering layer, light incident at virtually any angle relative to said scattering layer is diffusely reflected from said multisurfaced scattering layer.

2. A solar thermal energy converter having fluid optical switching means providing temperature limitation to said converter, said converter comprising:
   solar radiation absorbing means to collect incident sunlight energy and convert said sunlight energy into heat energy;
   thermal transfer means for conductance of heat energy from the collector;
   a relatively thin optical scattering layer interposed between said photo-receptive layer and a source of light energy, said scattering layer comprising a highly dispersed, multisurfaced layer of an essentially transparent material having a predetermined index of refraction dispersed in a second light transmitting media having an index of refraction differing from the index of refraction for said material;
   a layer of optically transparent fluid media, contiguous to said multisurfaced scattering layer and contacting essentially all surfaces thereof, said fluid media having an index of refraction about equal to the refractive index of said scattering surface, whereupon contacting said scattering layer with said fluid of material refractive index, said layer is rendered transparent;
   container means having at least one light transparent window, said container means retaining said fluid media contiguous to said scattering layer between said absorbing surface and said transparent window;
   fluid extracting means for controllably removing the optical fluid media from said container and further from contacting said multisurfaced scattering layer, whereupon removing said fluid from contacting said scattering layer;
   light incident at virtually any angle relative to said scattering layer is diffusely reflected from said multisurfaced scattering layer;
   fluid replenishing means for controllably replacing the optical fluid media extracted from said contain means.

3. A solar thermal energy converter having fluid optical switching means responsive to a pre-determined temperature level of said converter, said energy converter comprising:
   solar radiation absorbing means to collect incident sunlight energy and convert same into heat energy;
   thermal transfer means for conductance of heat energy from the collector;
   a relatively thin optical scattering layer of essentially transparent material interposed between said absorbing means and the source of sunlight energy, said scattering layer having a predetermined index of refraction;
   a layer of optically transparent fluid media having a predetermined boiling temperature and an index of refraction about equal to the refractive index of said scattering surface, said fluid being contiguous to said scattering layer and contacting virtually all surfaces thereof below a predetermined temperature, said fluid vaporizing above said predetermined temperature, whereupon a substantial portion of incident light is reflected from said scattering layer;
   container means having at least one light transparent window, said container means retaining said fluid media contiguous to said scattering surface below said predetermined temperature;
   condensor means for receiving said vaporized fluid media and transforming same into fluid by means of condensation;
   pressure regulation means interposed between said container and said condensor;
   fluid replenishing means for controllably replacing said condensate to the scattering surface.

4. The energy converter of claim 2 or 3 wherein said multisurfaced scattering layer is further characterized as having at least about 60 surfaces traversed by an incident beam of light which results in the diffuse reflection of greater than about 50 percent of light incident at virtually any angle.

5. The energy converter of claim 4 wherein said material comprises one of the group consisting of cellulose acetate, cellulose acetate butyrate, polyethylene, polymethyl methacrylate, polypropylene, polytrifluorochloroethylene, polytetrafluoroethylene or acetal.

6. The energy converter of claim 4 wherein said scattering layer comprises polyurethane foam having a thickness less than about 1 cm and further characterized as having an individual cell diameter of about 0.01 cm.

7. The energy converter of claim 4 wherein said scattering lay comprises fibrous matting of polytetrafluoroethylene foam whose individual fibers are about 5 microns in diameter.

8. The energy converter of claims 2 or 3 wherein said fluid media comprises one or more of the group consisting of water, ethylene glycol, or paraffin.

9. The energy converter of claim 8 wherein said fluid comprises a mixture of 40 percent ethylene glycol in water.

* * * * *